No. 709,785. Patented Sept. 23, 1902.
W. G. LITTLE.
TOBACCO TRUCK.
(Application filed June 20, 1902.)
(No Model.) 2 Sheets—Sheet 1.
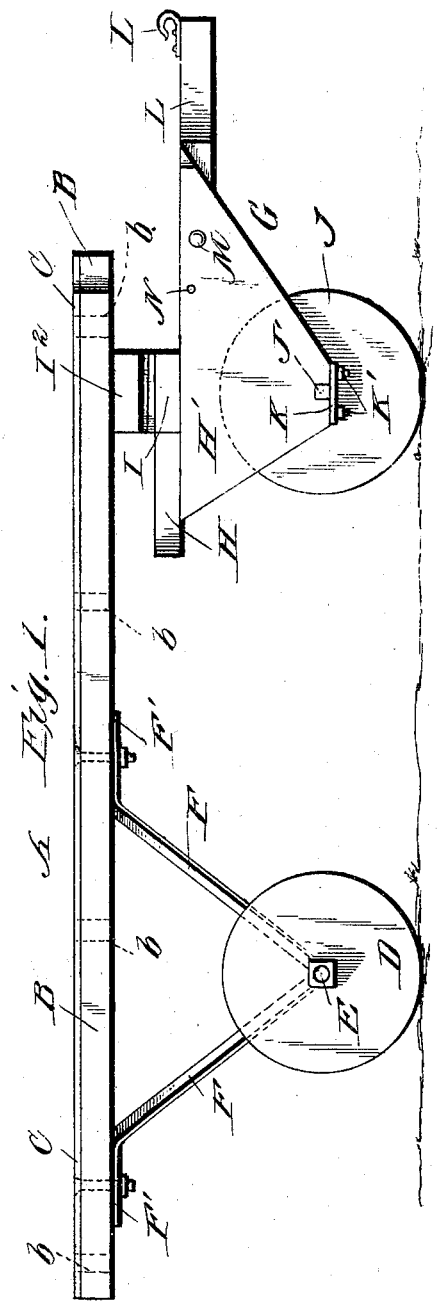
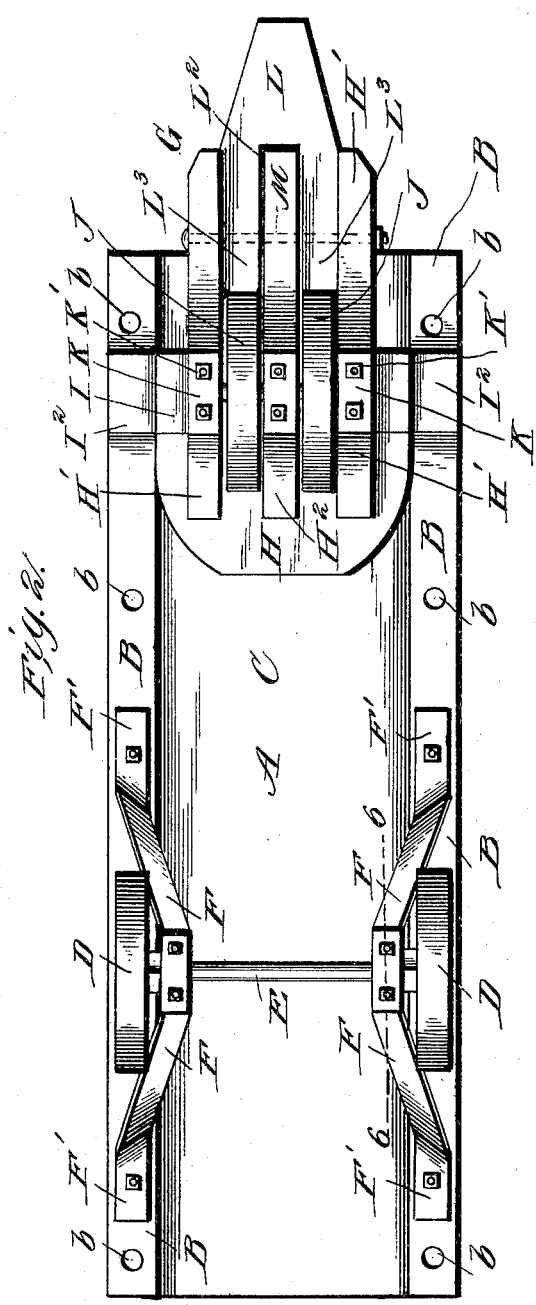
WITNESSES:
Fred Bradford
Perry B. Terpin
INVENTOR
William G. Little
BY Munn & Co.
ATTORNEYS.

No. 709,785. Patented Sept. 23, 1902.
W. G. LITTLE.
TOBACCO TRUCK.
(Application filed June 20, 1902.)
(No Model.) 2 Sheets—Sheet 2.
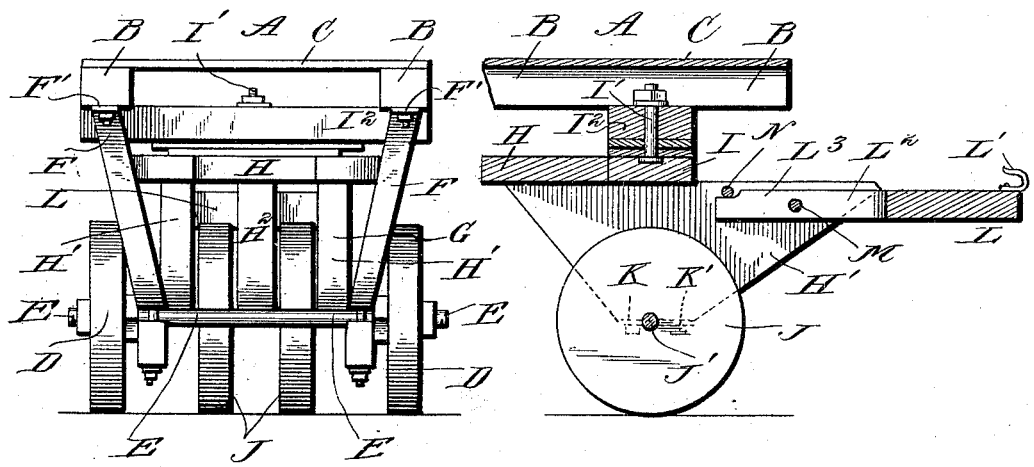
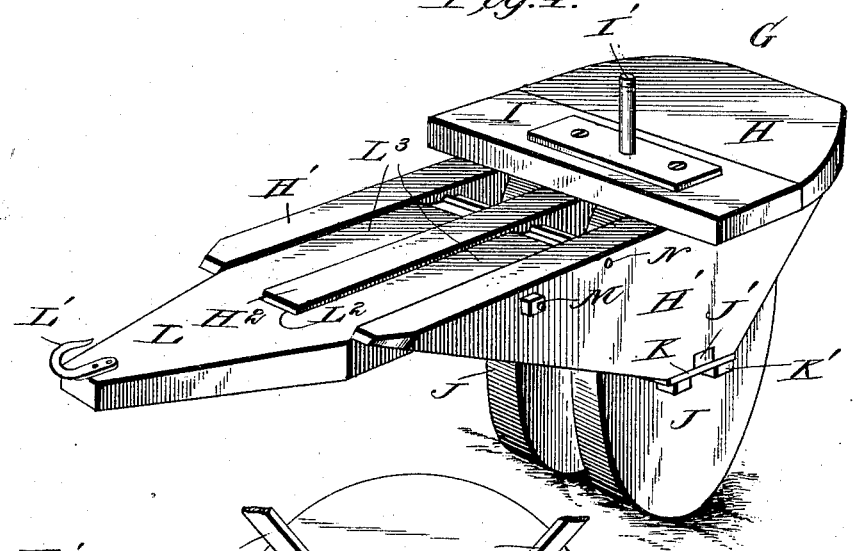
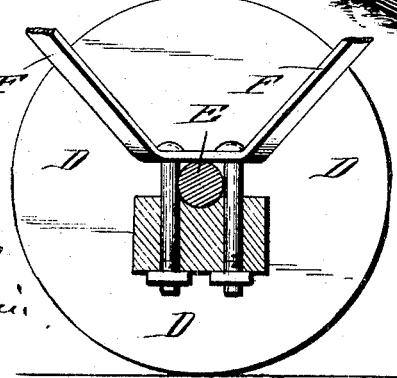
WITNESSES:
INVENTOR
William G. Little,
BY Munn & Co.
ATTORNEYS.

UNITED STATES PATENT OFFICE.

WILLIAM G. LITTLE, OF FARMVILLE, NORTH CAROLINA, ASSIGNOR OF ONE-HALF TO ROBERT L. DAVIS, OF FARMVILLE, NORTH CAROLINA.

TOBACCO-TRUCK.

SPECIFICATION forming part of Letters Patent No. 709,785, dated September 23, 1902.

Application filed June 20, 1902. Serial No. 112,469. (No model.)

*To all whom it may concern:*

Be it known that I, WILLIAM G. LITTLE, a citizen of the United States, and a resident of Farmville, in the county of Pitt and State of North Carolina, have made certain new and useful Improvements in Tobacco-Trucks, of which the following is a specification.

My invention is an improved truck intended especially to be used in moving leaf-tobacco from the field to the barn; and the invention consists in certain novel constructions and combinations of parts, as will be hereinafter described and claimed.

In the drawings, Figure 1 is a side elevation, and Fig. 2 is a bottom plan view, of the truck embodying my invention. Fig. 3 is a rear elevation of the truck. Fig. 4 is a detail perspective view of the upper side of the front-wheel frame with the wheels and draft-bar in place, and Fig. 5 is a detail central view showing the pivot and stop rods for the arms of the draft-bar, and Fig. 6 is a detail section on about line 6 6 of Fig. 2.

By my invention I seek to provide a truck which will be narrow, so it can operate between the tobacco rows, will be light, so it can be readily drawn from place to place, will have sufficient strength, will not be likely to turn over, in which all the wheels will be arranged within the lines of the opposite sides of the bed of the truck and in which the front of the truck will be supported by a pair of wheels mounted in the wheel-frame connected to turn and affording a support at the front of the truck of sufficient width to reduce to a minimum the danger of the truck overturning. I secure these results by the special construction shown in the drawings and which I will now describe in detail.

The bed A of the truck is of a special construction, being provided with the longitudinal stringers or beams B at its opposite sides and the thin bed-boards C, secured at their ends upon the upper sides of the stringer-bars B. By this construction the stringer-bars give the desired strength and rigidity to the bed and afford means for the connection of the supporting devices for the front and rear wheels, as will appear more fully hereinafter. These side beams also provide for the formation of the sockets $b$ for the side stanchions whenever it is desired to use such parts. The rear wheels D are mounted on an axle E, which is supported at the lower inner ends of the brackets F. These brackets F are in the form of metal bars, having at their ends ears F', lapped beneath and bolted to the side beams B, such brackets F being deflected inwardly toward their lower ends, so the rear wheels may be arranged to operate practically within the lines of the side of the bed, thus avoiding any obstructions beyond the sides of the bed and permitting the greatest width of bed with a given width of truck.

In supporting the front wheels I provide a frame G, having a top plate H, on which I secure the pivot-block I, provided with the king-bolt $I^2$, which pivots in the front cross-beam $I^3$, which extends between the opposite side beams, near the front ends thereof, and is secured firmly to the under sides of said wheels, as shown. This front cross-beam operates not only to form a pivot for the king-bolt, but also serves to brace the bed of the truck, at the front end thereof, the rear end of the bed of the truck being braced by the brackets F and the rear axle, as shown in the drawings and as before described.

In tobacco-trucks it is desirable to provide a broad bearing or support at the front of the truck to prevent the truck from overturning when loaded with tobacco, which is injurious to the tobacco, as is well known; and I prefer to secure this result by means of the two wheels J, which are journaled in the front-wheel frame, as will be more fully described hereinafter.

The frame G is provided with a side plate H' and the intermediate plate $H^2$, secured firmly to the under side of the top plate H and spaced apart to receive between them the wheels J and the arms of the draft-bar presently described. These plates H' and $H^2$ slope on their under sides upwardly toward their front ends and are provided near their lower edges with plates K and bolts K' for securing the axle J', on which the wheels J turn, between the plates H' and $H^2$, being spaced apart by a plate $H^2$, as shown.

The draft-bar L is provided at its front end L' with a hook or similar means whereby the draft may be applied and has in its rear end a central longitudinal slot L², receiving the intermediate plate H³ of the wheel-frame and forming the arms L³, which fit on opposite sides of the plate H² and between said plate and the side plates H'. These arms L³ of the draft-bar are pivoted on the bolt M midway between their ends to the plates H' and H² of the front-wheel frame and engaged at their rear ends to the stop-rod N, held in the main frame and limiting the upward movement of the rear ends of the arms L³ of the draft-bar.

By the described construction the draft-bar can tilt readily to adjust itself to the line of draft and there will be no tendency of the draft to lift the front wheels out of the ground and so increase the tendency of the truck to turn over. It will also be noticed I provide a truck in which the two front wheels are conveniently supported, so they will operate in the furrow formed between the tobacco rows, it being understood that in the cultivation of tobacco a flat furrow is usually provided midway between the rows of tobacco and in the use of my invention the front wheels J operate in such furrow.

By the described construction of wheel-frame the front wheels are separated and yet are not spread far apart, for the reason that tobacco rows are always finished by a plow-furrow, leaving a flat space in the center between the rows, and it is desired for the front wheels to both run in the furrow, so as to avoid any tilting. The two front wheels hold the truck quite steady and reduce the danger of its turning over to the minimum.

Having thus fully described my invention, what I claim as new, and desire to secure by Letters Patent, is—

1. The truck herein described comprising a bed having the longitudinal side beams, and the cross top boards secured at their outer ends upon the upper sides of the side beams, the cross-beam secured beneath the side beams near the front ends of the latter, the brackets for the rear wheels secured at their upper ends to the side beams and inclining thence inwardly toward the lower ends, and provided at such ends with means for securing the rear axle, the rear wheels supported on said axle within the lines of the sides of the bed, the front-wheel frame having a top plate provided with a block and the king-bolt extending therefrom and journaled in the front cross-beam of the bed, the side and intermediate plates secured to the under side of the top plate and spaced apart, the wheels between the side plates and the intermediate plate and spaced apart by the intermediate plate, the draft-bar provided at its rear ends with a central longitudinal slot forming side arms pivoted between their ends between the side plates and the intermediate plate, and a stop-rod supported by the said plates and operating above the rear ends of the arms of the draft-bar substantially as and for the purposes set forth.

2. The combination in a truck with the bed and the rear wheels and the supporting devices for the rear wheels, of a pair of front wheels, the front-wheel frame having a top plate, and side and intermediate plates depending from the top plate and spaced apart, the front wheels journaled between the side and intermediate plates and spaced apart by the intermediate plate, the king-bolt connecting the wheel-frame within the truck-bed and the draft-bar provided at its rear end with arms operating between the intermediate plate and the side plates and pivoted thereto, substantially as set forth.

3. The combination in a truck with the bed and the rear wheels, of the front-wheel frame having pivotal connection with the bed and comprising the top plate, and the side and intermediate plates depending from the top plate and spaced apart, the pair of front wheels journaled between the side and intermediate plates and spaced apart by the intermediate plate, the draft-bar provided at its rear end with the arms operating between the intermediate plate and the side plates and pivoted to said plates between their ends, and stop devices for limiting the movement of the draft-bar substantially as set forth.

WILLIAM G. LITTLE.

Witnesses:
GEO. W. FREEMAN,
R. L. DAVIS.